United States Patent
Park et al.

(10) Patent No.: US 9,161,320 B2
(45) Date of Patent: Oct. 13, 2015

(54) APPARATUS AND METHOD FOR DETERMINING GATEWAY CONSIDERING LOW POWER

(71) Applicant: Samsung Electronics Co. Ltd.

(72) Inventors: Seung-Hoon Park, Seoul (KR); Tae-Han Bae, Seoul (KR); Chi-Hong Cho, Suwon-si (KR); Eun-Tae Won, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 248 days.

(21) Appl. No.: 13/628,666

(22) Filed: Sep. 27, 2012

(65) Prior Publication Data

US 2013/0077548 A1 Mar. 28, 2013

(30) Foreign Application Priority Data

Sep. 28, 2011 (KR) ........................ 10-2011-0098454

(51) Int. Cl.
*H04L 12/66* (2006.01)
*H04W 52/46* (2009.01)

(52) U.S. Cl.
CPC ................ *H04W 52/46* (2013.01); *Y02B 60/50* (2013.01)

(58) Field of Classification Search
CPC ................ H04W 40/04–40/08; H04W 40/20; H04W 40/244; H04W 52/0206; H04W 52/0209; H04W 84/18–84/22; H04W 88/06–88/10; H04W 88/16
USPC ......... 370/329–331, 338, 254, 310–311, 332, 370/400–401, 449, 491, 500; 709/249
See application file for complete search history.

(56) References Cited

U.S. PATENT DOCUMENTS

| | | | |
|---|---|---|---|
| 7,184,421 B1 * | 2/2007 | Liu et al. ........................ | 370/338 |
| 8,036,144 B2 | 10/2011 | Kim | |
| 8,055,740 B2 | 11/2011 | Kim et al. | |
| 2004/0198408 A1 * | 10/2004 | Dillon et al. .................. | 455/522 |
| 2004/0258239 A1 * | 12/2004 | Gallant et al. ................ | 379/900 |
| 2005/0250527 A1 * | 11/2005 | Jugl et al. ...................... | 455/522 |
| 2006/0233137 A1 * | 10/2006 | Dantu et al. .................. | 370/331 |
| 2006/0253488 A1 * | 11/2006 | Akaiwa ........................ | 707/102 |
| 2009/0168670 A1 | 7/2009 | Yang | |
| 2010/0039969 A1 * | 2/2010 | Sukenari et al. .............. | 370/310 |
| 2011/0026637 A1 * | 2/2011 | Lee et al. ...................... | 375/295 |

FOREIGN PATENT DOCUMENTS

| | | |
|---|---|---|
| KR | 10-2009-0036178 A | 4/2009 |
| KR | 10-2009-0072039 A | 7/2009 |
| KR | 10-2009-0076563 A | 7/2009 |

* cited by examiner

*Primary Examiner* — Charles C Jiang
*Assistant Examiner* — Mohamed Kamara
(74) *Attorney, Agent, or Firm* — Jefferson IP Law, LLP

(57) ABSTRACT

An apparatus and a method for determining a gateway using lower power are provided. The method includes setting probing transmission power for setting the gateway, transmitting a probing request message to another mobile station existing in a cluster with the set probing transmission power, when a probing response message is received from the other mobile station, generating a probing response list for the mobile station having transmitted the probing response message, determining whether a cluster list for mobile stations existing in the cluster corresponds to the probing response list, and determining a gateway mobile station according to a result of the determination as to whether the cluster list for mobile stations existing in the cluster corresponds to the probing response list.

18 Claims, 7 Drawing Sheets

APPARATUS AND METHOD FOR DETERMINING GATEWAY CONSIDERING LOW POWER

PRIORITY

This application claims the priority under 35 U.S.C. §119(a) of a Korean patent application filed in the Korean Industrial Property Office on Sep. 28, 2011 and assigned Ser. No. 10-2011-0098454, the entire disclosure of which is hereby incorporated by reference.

BACKGROUND OF THE INVENTION

1. Field of the Invention

The present invention relates to a mobile communication system. More particularly, the present invention relates to an apparatus and a method for determining a gateway mobile station capable of broadcasting with low power when a base station transmits a control message.

2. Description of the Related Art

In general, a Mobile Ad-hoc Network (MANET) refers to a technology in which mobile stations are connected in a multi-hop fashion when short range communication is possible between the mobile stations and data is transmitted to a destination mobile station after a proper path is found through a routing technique.

The MANET has heretofore been predominantly used as military equipment in a battle field having insufficient infra communication networks. However, MANET has recently evolved to a public safe network capable of operating even when an act of terrorism or a disaster occurs, or a smart grid type network for controlling electricity, water supply, and gas.

Meanwhile, a Beyond $4^{th}$ Generation (B4G) technology is being researched to address the limitation in a transmission rate of 4th Generation (4G) communication such as Long Term Evolution (LTE) or Worldwide interoperability for Microwave Access (WiMAX). In the B4G technology, it is expected that related art cellular communication is combined with other types of communication.

FIG. 1 is a view illustrating a heterogeneous network including a cellular network and an ad-hoc network according to the related art.

A heterogeneous network generated when one Mobile Station (MS or terminal node) can simultaneously access the cellular network and the MANET may be configured as illustrated in FIG. 1.

When a cell cannot completely accommodate increasing mobile stations because the mobile stations are far away from a base station or an interference signal from a neighboring base station is strong, the base station does not directly perform transmission/reception with a target mobile station and performs the transmission through another mobile station in a multi-hop fashion. At this time, the base station can manage the mobile stations by a cluster in order to control the mobile stations in response to an increase in cell capacities, as illustrated in FIG. 1.

Another reason why such a structure is generated is that a case is created in which the cluster is formed between mobile stations, which are regionally close to each other, is increased as services related to a Social Networking Service (SNS), a game, a chat, a bulletin board, and the like according to a short range communication network. The structure may be applied to data transmission for the above services.

A cluster according to the related art can access the cellular network through a single or a plurality of gateways. A method of determining such a gateway mobile station is an issue which has been frequently researched in the MANET.

However, a method of determining the gateway according to the related art has a problem in that only a data transmission rate, a routing overhead, a power consumption rate, and a transmission delay of each mobile station are considered because the method is configured to optimize only requirements of the ad-hoc network.

Further, the method has a problem in that only data collected by the gateway from the mobile station is considered because it is assumed that the gateway is connected through an Internet wired network.

Therefore, a need exists for an apparatus and a method for determining a gateway mobile station, which is suitable for transmitting data, from mobile stations when a heterogeneous network is configured by the mobile stations which can simultaneously access a cellular network and a wireless ad-hoc network.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide an apparatus and a method for determining a gateway mobile station, which is suitable for transmitting data, from mobile stations when a heterogeneous network is configured by the mobile stations which can simultaneously access a cellular network and a wireless ad-hoc network.

In accordance with an aspect of the present invention, an apparatus for determining a gateway considering low power is provided. The apparatus includes a wireless unit for transmitting and receiving a message, and a control unit for setting probing transmission power for determining the gateway, transmitting a probing request message to another mobile station existing in a cluster with the set probing transmission power, when a probing response message is received from the other mobile station, for generating a probing response list for the mobile station having transmitted the probing response message, for determining whether a cluster list for mobile stations existing in the cluster corresponds to the probing response list, and for determining a gateway mobile station according to a result of the determination as to whether the cluster list for mobile stations existing in the cluster corresponds to the probing response list.

In accordance with another aspect of the present invention, a method of determining a gateway considering low power is provided. The method includes setting probing transmission power for setting the gateway, transmitting a probing request message to another mobile station existing in a cluster with the set probing transmission power, when a probing response message is received from the other mobile station, generating a probing response list for the mobile station having transmitted the probing response message, determining whether a cluster list for mobile stations existing in the cluster corresponds to the probing response list, and determining a gateway mobile station according to a result of the determination as to whether the cluster list for mobile stations existing in the cluster corresponds to the probing response list.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

Figure 1:
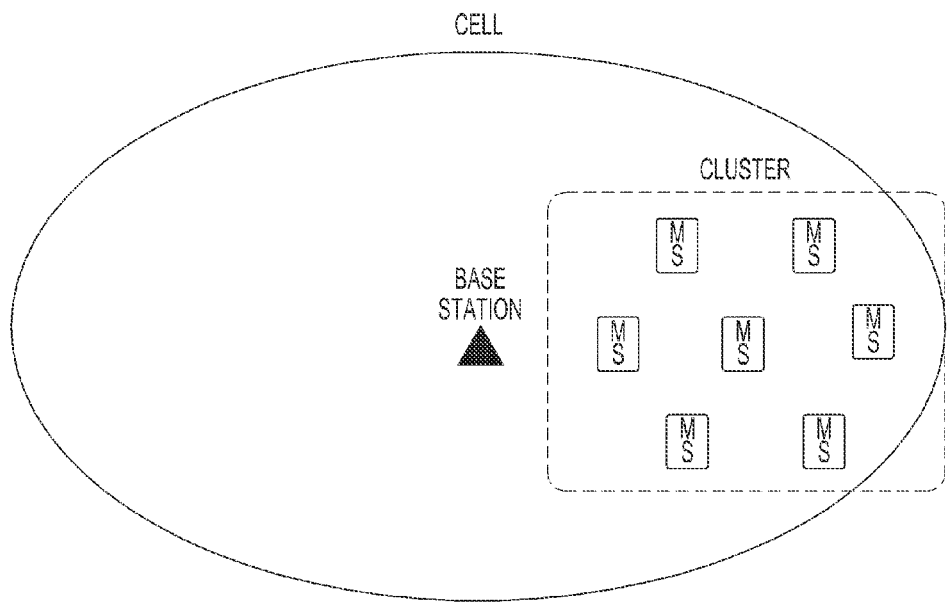
FIG. 1 is a view illustrating a heterogeneous network including a cellular network and an ad-hoc network according to the related art.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

First, exemplary embodiments of the present invention determine a gateway mobile station from mobile stations when a heterogeneous network is configured by the mobile stations which can simultaneously access a cellular network and a wireless ad-hoc network.

Although a base station generally uses a cellular communication apparatus of each mobile station in order to transmit a particular control message to mobile stations, the base station can transmit the control message to one representative mobile station of the mobile stations and then the representative mobile station having received the control message can transmit the control message to other neighboring mobile stations in order to reduce power consumption of the mobile station or when available resources of the base station are not sufficient.

For such an operation, requirements for determining the representative mobile station serving as the gateway and a determination algorithm are necessarily required.

Various methods for determining the gateway mobile station have been proposed in a Mobile Ad-hoc Network (MANET), and a mode suitable for an operation for collecting information detected from each mobile station mainly, such as by a sensor network, and then transmitting the collected information to an Internet network has been considered.

Exemplary embodiments of the present invention consider a mode for achieving low power while being suitable for a process of transmitting a message from a cellular network to the gateway mobile station and then transmitting the message from the gateway mobile station to each mobile station.

To this end, it is required to determine an intensity of transmission power of the gateway mobile station and the number of mobile stations which can directly receive a broadcasting signal transmitted from the gateway mobile station.

First, by minimizing the intensity of the transmission power of the gateway mobile station, power consumption of the gateway mobile station may be reduced and interference generated when a plurality of gateway mobile stations transmit a broadcasting message may be minimized.

Further, by maximizing the number of mobile stations which can receive the broadcasting signal transmitted from the gateway, the broadcasting signal may be transmitted with a smallest number of hops as far as possible. For example, when a broadcasting signal containing a particular control message is transmitted to a cluster through the cellular network, the control message is transmitted to all mobile stations within the cluster at the same time as far as possible. When the control message is transmitted in a multi-hop fashion, because a speed of a control signal is limited by a mobile station causing the largest delay, it is advantageous to directly transmit the control message with a high transmission power so as to transmit as far as possible.

In the method of determining the gateway in a related art wireless ad-hoc network, the network is generally configured to have a tree structure, a header mobile station is the gateway or the network is configured to have a mesh structure, and a single or a plurality of mobile stations are the gateway. Further, the gateway broadcasts the control message to an entire cluster through adjacent connected mobile stations, but in this case, a problem related to a delay of the control signal is generated.

Accordingly, exemplary embodiments of the present invention suggest a method in which candidate mobile stations which can be the gateway start transmitting the message while gradually increasing transmission power and a single or a plurality of candidate mobile stations for first transmitting the message to all mobile stations within the cluster are determined as the gateway.

Figure 2:
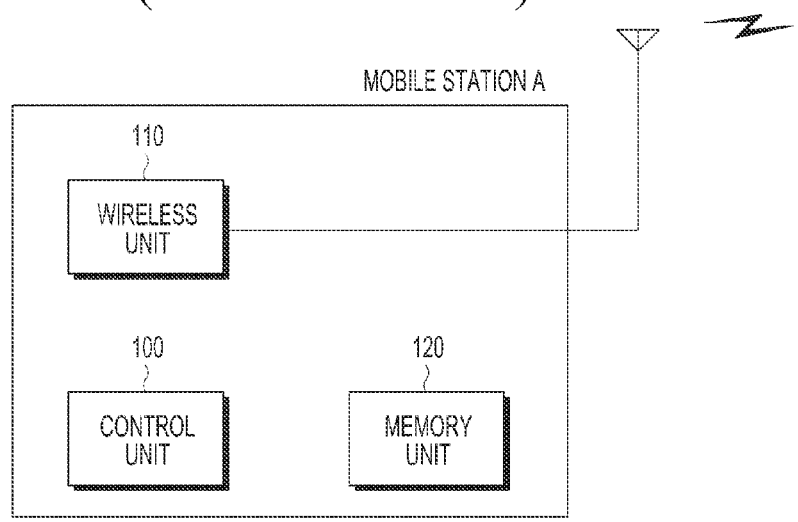
FIG. 2 is a view illustrating a configuration of a mobile station according to an exemplary embodiment of the present invention.

FIG. 2 is a view illustrating a configuration of a mobile station according to an exemplary embodiment of the present invention.

First, it is assumed that a cluster has been already configured and all mobile stations within the cluster have already recognized information (an IDentifier (ID) and the like) on other mobile stations within the cluster in exemplary embodiments of the present invention. It is assumed that the information on the mobile stations within the cluster is stored as a cluster mobile station list (Cluster_Node_List: C_List). At this time, the cluster mobile station list is a reference by which the gateway candidate mobile station controls transmission power for transmitting the message to the cluster.

Referring to FIG. 2, a mobile station A includes a control unit 100, a wireless unit 110, and a memory unit 120.

The control unit 110 identifies whether there is the gateway mobile station within the cluster, and transmits a gateway setup request message (Gateway_Setup_Request) to all mobile stations within the cluster when there is no gateway mobile station within the cluster.

When the control unit 100 receives a gateway setup response message (Gateway_Setup_Response) containing information on the mobile stations such as ID information from other mobile stations, the control unit 100 generates and updates a gateway setup response mobile station list (Gateway_Setup_Response_Node_List: GSR_List) by using the mobile station information.

The control unit 100 updates the GSR_List and identifies whether the GSR_List corresponds to C_List which is information on the mobile stations within the cluster for a predetermined maximum standby time (Max_ListenTime). When the GSR_List corresponds to the C_List or the maximum standby time (Max_ListenTime) arrives, the control unit 100 directly transmits a gateway setup start message (Gateway_Setup_Start) to mobile stations included in the GSR_List or the C_List and starts a gateway setup process.

In the above description, a step of entering the gateway setup process has been briefly discussed. Although the step of entering the gateway setup process is not a necessary step for exemplary embodiments of the present invention, the step may be added to exemplary embodiments of the present invention so as to make exemplary embodiments of the present invention more efficient.

Thereafter, the control unit 100 performs a probing process in order to determine the transmission power for transmitting the message to the cluster.

The probing process is performed while each gateway candidate mobile station gradually increases transmission power of a probing request message (Probing_Request) for the probing.

Specifically, the control unit 100 transmits the probing request message to a plurality of mobile stations within the cluster with a preset threshold transmission power, and generates a probing response mobile station list (Probing_Response_Node_List: PR_List) by using mobile station information such as ID information of mobile stations included in the received probing response message when the probing response message is received from the plurality of mobile stations.

The probing response message includes the probing response mobile station list (Probing_Response_Node_List) currently belonging to each mobile station as well as the ID information of the mobile station, and uses the probing response mobile station list in determining a final gateway mobile station among the plurality of gateway candidate mobile stations.

The control unit 100 compares the probing response mobile station list and the pre-stored cluster mobile station list to determine whether the probing response mobile station list corresponds to the cluster mobile station list.

When the probing response mobile station list corresponds to the cluster mobile station list as a result of the determination, the control unit 100 transmits a gateway determination message for informing that the mobile station A has been determined as the gateway mobile station to all mobile stations within the cluster, transmits a message for identifying the gateway to all mobile stations, and then completes the gateway setup.

When the plurality of mobile stations having received the probing response message do not correspond to the plurality of mobile stations within the cluster, the control unit 100 transmits again the probing request message to the plurality of mobile stations within the cluster with higher transmission power than the preset threshold transmission power for transmitting the probing request message. For example, the control unit 100 transmits the probing request message with second threshold transmission power higher than the preset threshold transmission power by preset power. Further, when the plurality of mobile stations having received the probing response message do not correspond to the plurality of mobile stations within the cluster, the control unit 100 transmits the probing request message while continuously increasing transmission power until the plurality of mobile stations having received the probing response message correspond to the plurality of mobile stations within the cluster.

Meanwhile, when the control unit 100 receives a gateway notice message for informing that a mobile station B is the gateway mobile station from the mobile station B, the control unit 100 completes the gateway setup.

When a non-receipt notice message is received from the mobile station B, the control unit 100 compares the probing response mobile station list of the mobile station B with the probing response mobile station list of the mobile station A. When the probing response mobile station list of the mobile station B is larger than the probing response mobile station list of the mobile station A as a result of the comparison, the mobile station B is determined as the gateway mobile station, and the control unit 100 completes the gateway setup.

When the probing response mobile station list of the mobile station B is smaller than the probing response mobile station list of the mobile station A as a result of the comparison, the control unit 100 determines whether the number of mobile stations included in both the probing response mobile station list of the mobile station B and the probing response mobile station list of the mobile station A is larger than a preset threshold value.

When the number of mobile stations is greater than the preset threshold value as a result of the determination, the control unit 100 transmits a gateway re-setup request message to the mobile station B, and waits to receive the gateway notice message when a gateway re-setup response message is received from the mobile station B.

When the number of mobile stations is less than the preset threshold value as a result of the determination, the control unit 100 transmits the gateway determination message for informing that the mobile station A and the mobile station B have been determined as the gateway mobile station to all mobile stations within the cluster, transmits the message for identifying the gateway to all mobile stations, and then completes the gateway setup.

When the probing response mobile station list of the mobile station B is smaller than the probing response mobile station list of the mobile station A as a result of the comparison, the mobile station B is determined as the gateway mobile station, and the control unit 100 completes the gateway setup.

When the gateway notice message has not been received from another mobile station for the preset maximum standby time (Max_Listen Time), the control unit 100 transmits the non-receipt notice message broadcasted when the gateway notice message is not received for a predetermined time in a state in which the control unit 100 waits for receiving the gateway notice message to all mobile stations within the cluster.

Thereafter, the control unit 100 waits for receiving the gateway re-setup request message from other mobile stations. Then, when the gateway re-setup request message is received from another mobile station, for example, a mobile station C, the control unit 100 transmits a gateway re-setup response message in response to the gateway re-setup request message, and completes the gateway setup.

When the gateway re-setup request message has not been received for the preset maximum standby time (Max_Listen Time), the control unit 100 determines itself as the gateway mobile station, transmits the message for identifying the gateway to all mobile stations, and then completes the gateway setup.

The wireless unit 110 performs message transmission/reception between mobile stations.

The memory unit 120 stores a message used in the mobile station or data such as setup information.

Figure 3:
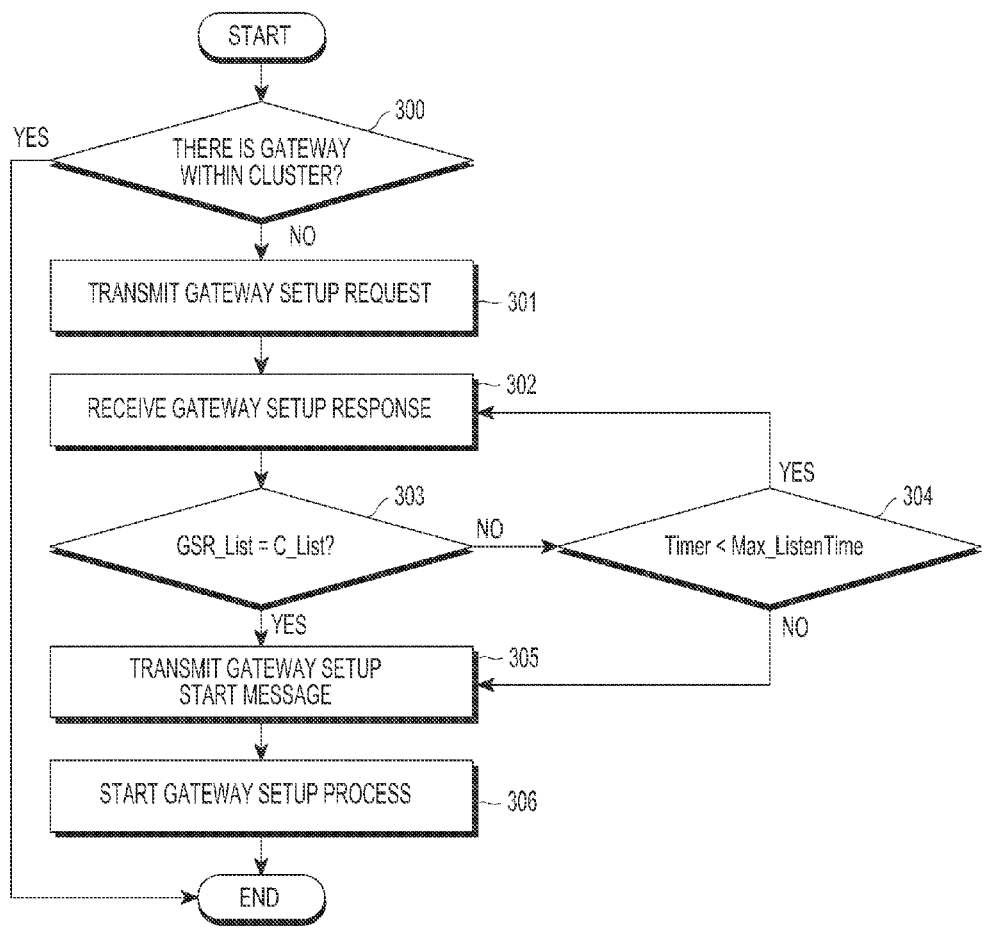
FIG. 3 is a flowchart illustrating a process of starting a gateway setup in a mobile station according to an exemplary embodiment of the present invention.

FIG. 3 is a flowchart illustrating a process of starting a gateway setup in a mobile station according to an exemplary embodiment of the present invention.

Referring to FIG. 3, in step 300, the control unit 100 determines whether there is the gateway mobile station within the cluster. When there is the gateway mobile station within the cluster, the control unit 100 terminates a gateway setup start. Otherwise, the control unit 100 proceeds to step 301.

In step 301, the control unit 100 transmits the gateway setup request message (Gateway_Setup_Request) to all mobile stations within the cluster. Thereafter, the control unit 100 proceeds to step 302.

When the gateway setup response message (Gateway_Setup_Response) including mobile station information such as ID information is received from other mobile stations in step 302, the control unit 100 proceeds to step 303. In step 303, the control unit 100 determines whether the gateway setup response mobile station list corresponds to the cluster list. When the control unit 100 determines that the mobile station lists correspond to each other, the control unit proceeds to step 305. Otherwise, the control unit 110 proceeds to step 304. Here, the gateway setup response message includes mobile station information such as ID information of the mobile station having transmitted the gateway setup response message, and the control unit 100 can configure and update the gateway setup response mobile station list by using the gateway setup response message.

In step 304, the control unit 100 determines whether the preset maximum standby time has passed. When the preset maximum standby time has not passed, the control unit 100 proceeds to step 302 in which the control unit 100 receives the gateway setup response message. When the preset maximum standby time has passed, the control unit 100 proceeds to step 305.

In step 305, the control unit 100 transmits the gateway setup start message (Gateway_Setup_Start) to mobile stations included in the GSR_List or the C_List, and starts the gateway setup process in step 306.

The respective mobile stations, which have received the transmitted gateway setup start message, included in the CSR_List or the C_List also start the gateway setup process.

Figure 4:
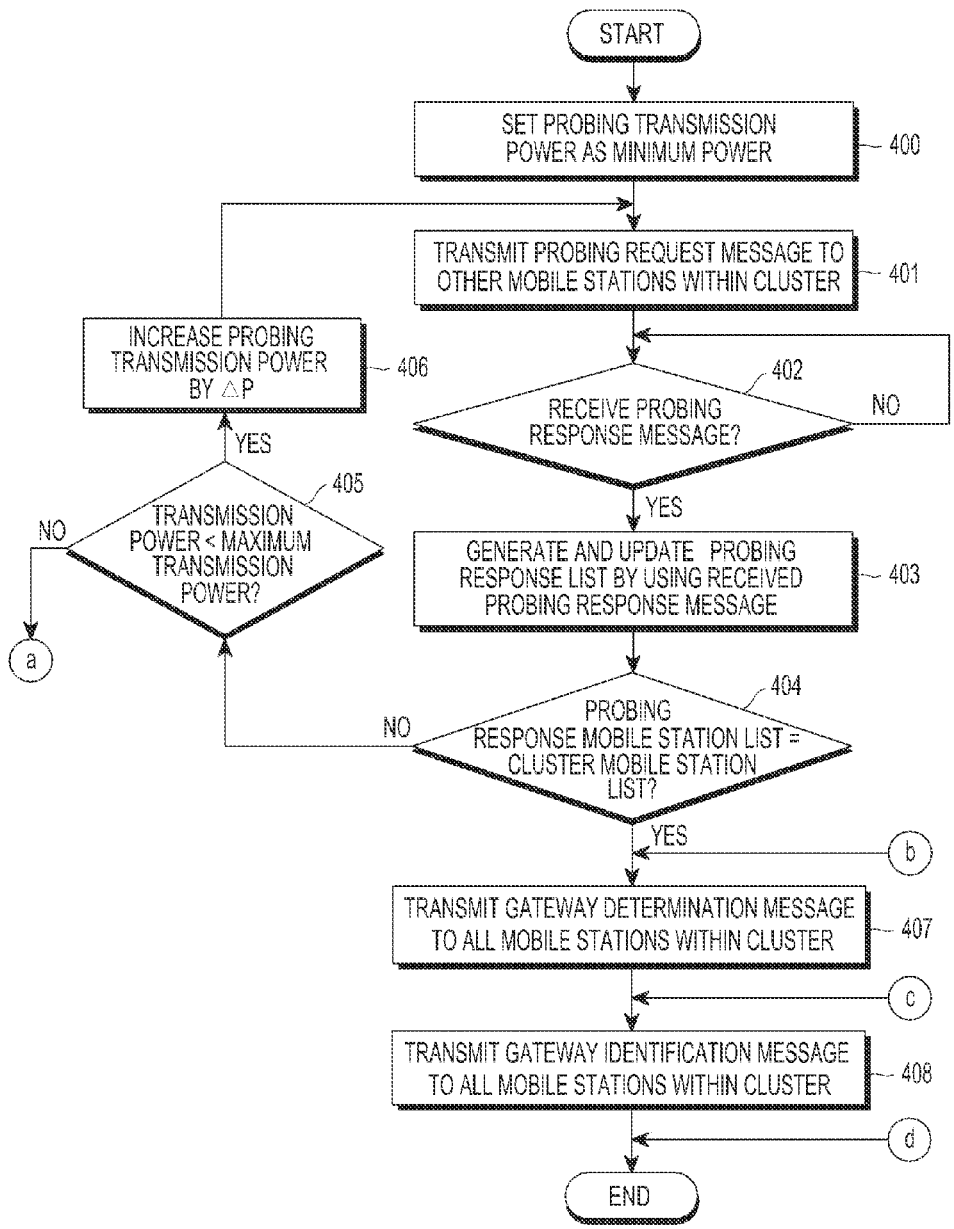
FIG. 4 is a flowchart illustrating a process of performing a gateway mobile station setup operation by a mobile station A according to an exemplary embodiment of the present invention.

FIG. 4 is a flowchart illustrating a process of performing a gateway mobile station setup operation by a mobile station A according to an exemplary embodiment of the present invention.

Referring to FIG. 4, in step 400, the control unit 100 sets probing transmission power for performing the probing process as a preset minimum power.

In step 401, the control unit 100 transmits the probing request message to a plurality of mobile stations within the cluster with the probing transmission power set as the minimum power.

In step 402, the control unit 100 determines whether the probing response message is received. When the probing response message is received, the control unit 100 proceeds to step 403. Otherwise, the control unit 100 continuously determines whether the probing response message is received.

In step 403, the control unit 100 generates and updates the probing response mobile station list by using mobile station information such as ID information of mobile stations included in the received probing response message.

The probing request message and the probing response message will be described with reference to FIGS. 5 to 7 as an example.

Figure 5:
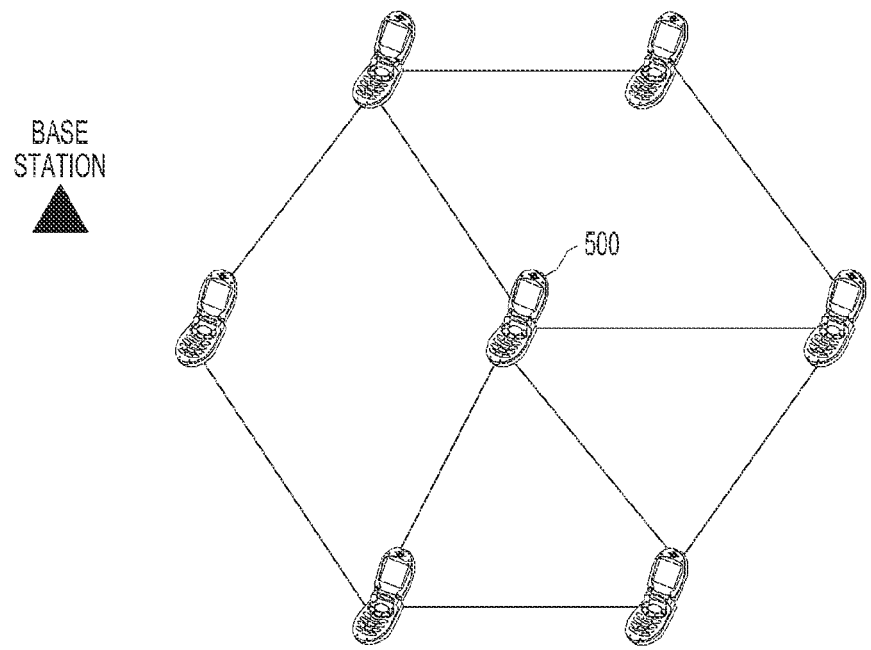
FIGS. 5 to 7 are illustrative views for describing a process in which the mobile station A transmits a probing request message to all mobile stations within a cluster and receives a probing response message from the corresponding mobile stations according to an exemplary embodiment of the present invention.
Figure 6:
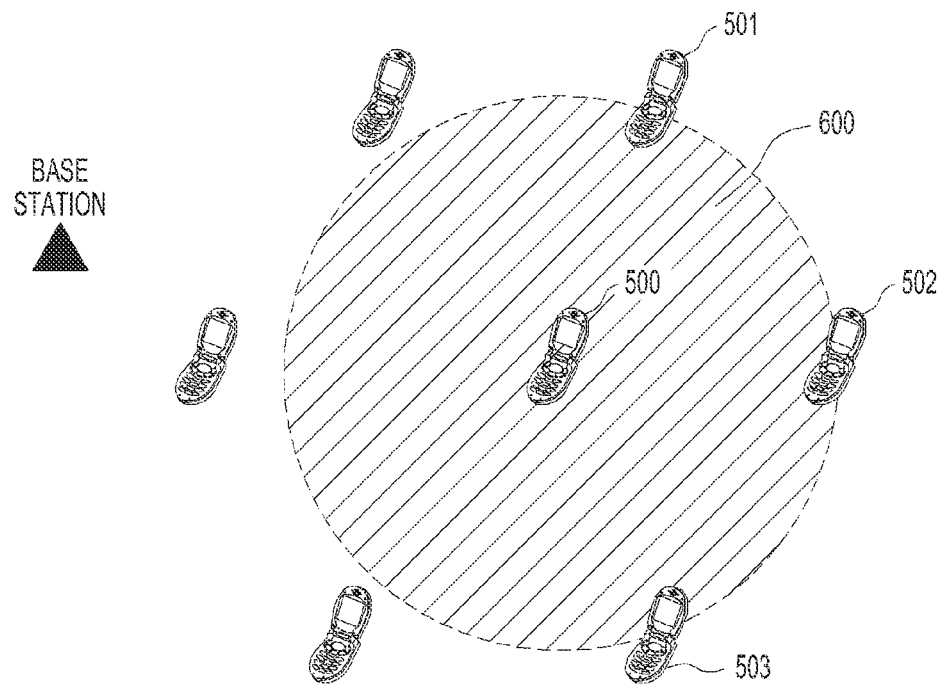
Figure 7:
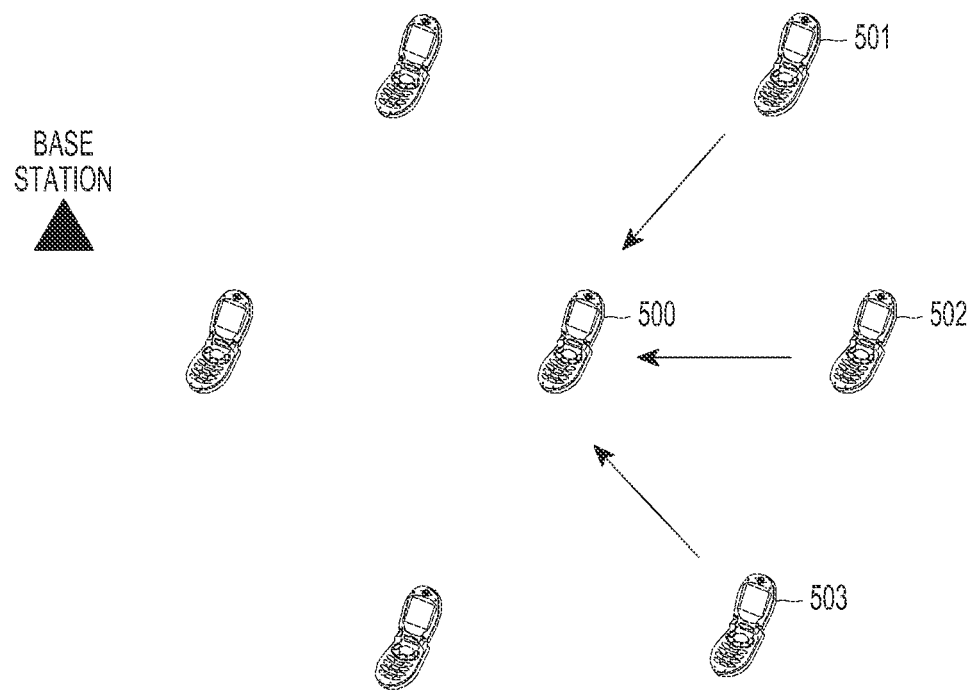

FIGS. 5 to 7 are illustrative views for describing a process in which a mobile station A transmits the probing request message to all mobile stations within a cluster and receives a probing response message from corresponding mobile stations according to an exemplary embodiment of the present invention.

First, referring to FIG. 5, a mobile station A 500 configures the cluster together with six mobile stations. The mobile station A 500 transmits the probing request message to mobile stations 501, 502, and 503 included in an area 600 in which a message can be transmitted with preset probing transmission power as illustrated in FIG. 6. Thereafter, the mobile station A 500 receives the probing response message from the corresponding mobile stations 501, 502, and 503 as illustrated in FIG. 7.

Returning to FIG. 4, after the control unit 100 generates and updates the probing response mobile station list, the control unit 100 proceeds to step 404. In step 404, the control unit 100 determines whether the probing response mobile station list corresponds to the cluster mobile station list. When the two lists correspond to each other, the control unit 100 proceeds to step 407. In contrast, when the two lists do not correspond to each other, the control unit 100 proceeds to step 405, and determines whether current probing transmission power is less than maximum probing transmission power. When the control unit 100 determines that the current probing transmission power is less than the maximum probing transmission power, the control unit proceeds to step 406. Otherwise, the control unit 100 proceeds to step a of FIG. 8. Processes after step a will be described further below with reference to FIG. 8. Further, processes before steps b, c, and d will be described further below with reference to FIGS. 8 and 9.

In step 406, the control unit 100 increases the probing transmission power by $\Delta P$, and proceeds to step 401 to broadcast the probing request message to mobile stations within the cluster with power corresponding to minimum power+$\Delta P$.

The control unit 100 having proceeded to step 407 from step 404 broadcasts the gate determination message indicating that the mobile station A is the gateway to all mobile stations within the cluster in step 407.

In step 408, the control unit 100 broadcasts the message for identifying the gateway to all mobile stations, and then completes the gateway setup.

Figure 8:
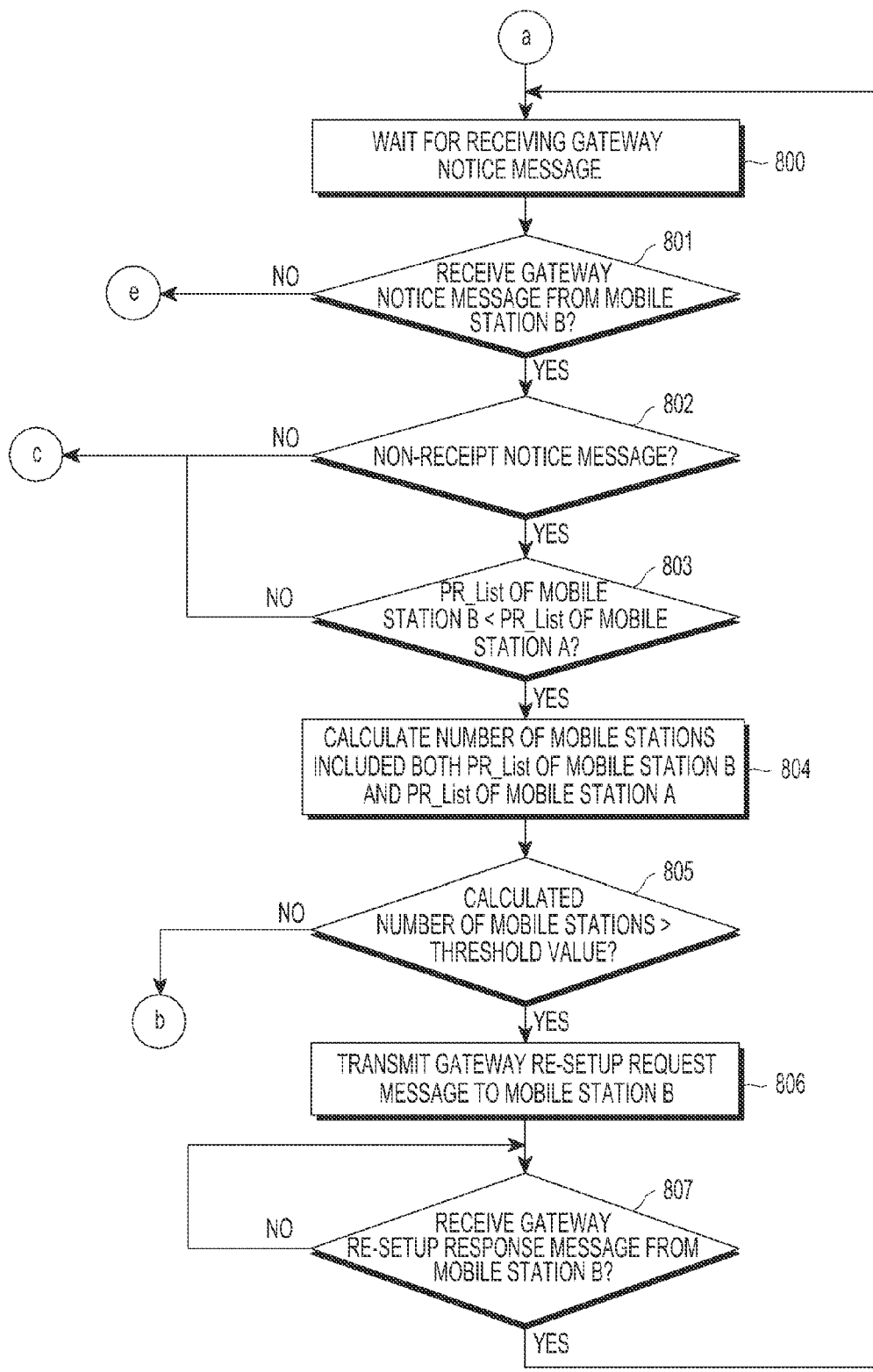
FIG. 8 is a flowchart illustrating a process of setting a gateway when a mobile station A performs a probing process with maximum transmission power according to an exemplary embodiment of the present invention.

FIG. 8 is a flowchart illustrating a process of setting the gateway when a mobile station A performs the probing process with the maximum transmission power according to an exemplary embodiment of the present invention.

Referring to FIG. 8, in step 800, the control unit 100 waits to receive the gateway notice message from other mobile stations.

In step 801, the control unit 100 determines whether the gateway notice message is received from other mobile stations. When the gateway notice message is received from the mobile station B, the control unit proceeds to step 802 in which the control unit 100 determines whether the gateway notice message is the non-receipt notice message. When the gateway notice message is not received in step 801, the control unit 100 proceeds to step e of FIG. 9. Processes after step e will be discussed further below in the description of FIG. 9.

When the received message is the non-receipt notice message in step 802, the control unit 100 proceeds to step 803. Otherwise, the control unit 100 proceeds to step c of FIG. 4 which corresponds to step 408, at which the control unit 100 broadcasts a gateway identification message for identifying that the mobile station B is the gateway mobile station to all mobile stations within the cluster.

In step 803, the control unit 100 determines whether the probing response mobile station list (PR_List) of the mobile station B is larger than the probing response mobile station list of the mobile station A.

When the control unit 100 determines that the probing response mobile station list (PR_List) of the mobile station B is larger than the probing response mobile station list of the mobile station A, the mobile station B is determined as the gateway mobile station, and the control unit 100 proceeds to step c of FIG. 4 which corresponds to step 408 of FIG. 4, at which the control unit 100 broadcasts the gateway identification message for identifying that the mobile station B is the gateway mobile station to all mobile stations within the cluster, and then completes the gateway setup.

When the probing response mobile station list (PR_List) of the mobile station A is larger than the probing response mobile station list (PR_List) of the mobile station B, the control unit 100 proceeds to step 804 in which the control unit 100 calculates the number of mobile stations included in both the probing response mobile station list of the mobile station A and the probing response mobile station list of the mobile station B.

In step 805, the control unit 100 determines whether the calculated number of mobile stations is greater than a preset threshold value. When the control unit 100 determines that the calculated number of mobile stations is greater than the preset threshold value, the control unit 100 proceeds to step 806. Otherwise, the control unit 100 proceeds to step b of FIG. 4 which corresponds to step 407 of FIG. 4, in which the control unit 100 transmits the gateway determination message for informing that the mobile station A and the mobile station B are determined as the gateway mobile station to all mobile stations within the cluster.

Thereafter, the control unit 100 transmits the message for identifying the gateway to all mobile stations within the cluster, and then completes the gateway setup in step 408.

The control unit 100 transmits the gateway re-setup request message to the mobile station B in step 806, and determines whether the gateway re-setup response message is received from the mobile station B in step 807. When the control unit 100 determines that the gateway re-setup response message is received, the control unit 100 proceeds to step 800, and waits to receive the gateway notice message.

Processes after step e are described below with reference to FIG. 9.

Figure 9:
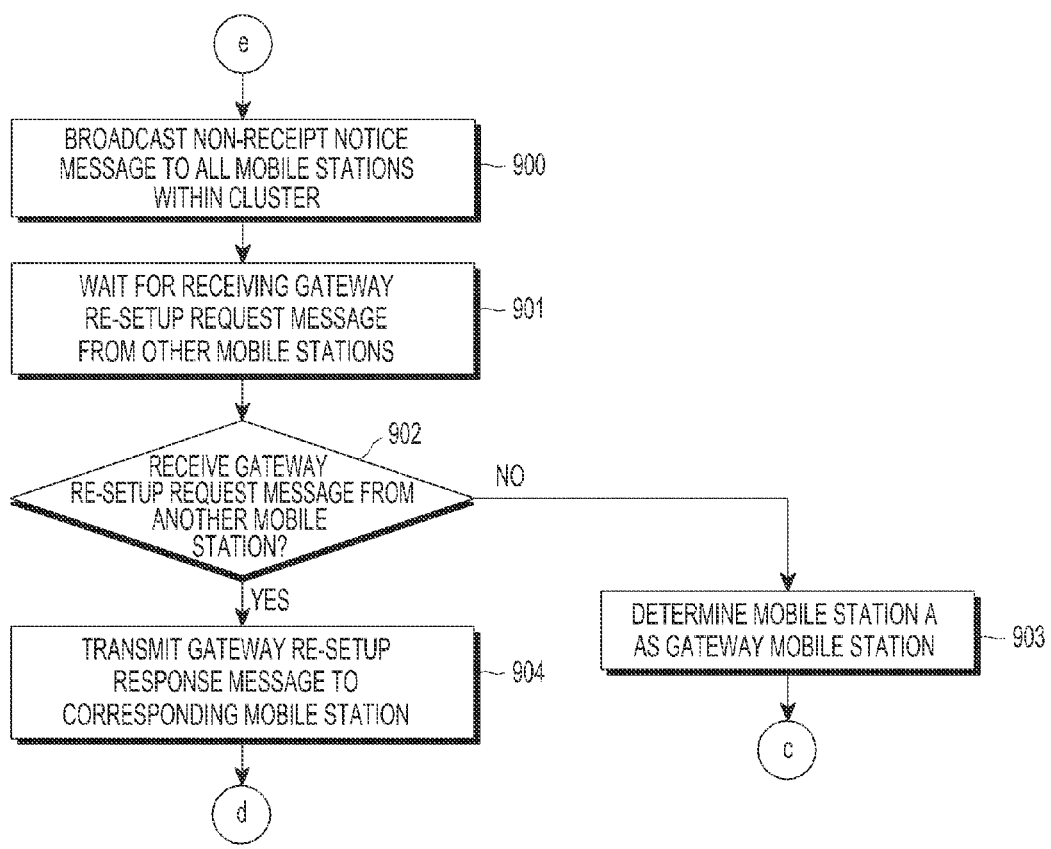
FIG. 9 is a flowchart illustrating a process of setting a gateway when a gateway notice message is not received from another mobile station according to an exemplary embodiment of the present invention.

FIG. 9 is a flowchart illustrating a process of setting a gateway when a gateway notice message is not received from another mobile station according to an exemplary embodiment of the present invention.

Referring to FIG. 9, when the gateway notice message is not received from another mobile station for the preset maximum standby time (Max_Listen Time), the control unit 100 transmits the non-receipt notice message broadcasted in step 900 to all mobile stations within the cluster, In step 901, the control unit 100 waits to receive the gateway re-setup request message from another mobile station.

In step 902, the control unit 100 determines whether the gateway re-setup request message is received from another mobile station. When the control unit 100 determines that the gateway re-setup request message is received, the control unit 100 proceeds to step 904. Otherwise, the control unit 100 proceeds to step 903 in which the control unit 100 determines the mobile station A as the gateway mobile station. Further, the control unit 100 proceeds to step c of FIG. 4 which corresponds to step 408 of FIG. 4, in which the control unit 100 transmits the message for identifying the gateway to all mobile stations, and then completes the gateway setup.

In step 904, the control unit 100 transmits the gateway re-setup response message to another mobile station, for example, the mobile station C, and proceeds to step d of FIG. 4 to complete the gateway setup.

As described above, exemplary embodiments of the present invention perform an effective gateway selection according to an arrangement condition within the cluster by implementing the probing process for selecting the gateway mobile station while gradually increasing transmission power for message transmission.

Accordingly, exemplary embodiments of the present invention can minimize an increase in the transmission power and determine proper transmission power and the gateway mobile station by which data can be directly transmitted to all mobile stations within the cluster at the same time without a multi-hop.

The above exemplary embodiments of the present invention may be embodied as program commands and may be stored in a non-transitory computer readable recording medium. The non-transitory computer readable recording medium may store program commands, data files, data structures, or a combination thereof. Program commands that may be stored in non-transitory computer readable recording medium may be specially designed and constructed for exemplary embodiments of the present invention or may be well known to those in the computer software field to which exemplary embodiments of the present invention pertains. Examples of the non-transitory computer readable medium are a magnetic recording medium, e.g., a hard disc, a floppy disc, a magnetic tape, or the like; an optical recording medium, e.g., a Compact Disc (CD)-Read Only Memory (ROM), a Digital Versatile Disc (DVD), or the like; a magneto-optical medium, e.g., an optical disk; and a hardware device, e.g., a ROM, a Random Access Memory (RAM), a flash memory, which is constructed to store and execute program commands. Examples of a program command include mechanical language code that may be made, for example, by using a compiler, and high-level language code that may be executed in at least one computer, for example, by using an interpreter.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An apparatus for determining a gateway considering low power, the apparatus comprising:
  a wireless unit configured to transmit and receive a message; and
  a control unit configured to:
    (i) set a probing transmission power for determining the gateway,
    (ii) transmit a probing request message to another mobile station existing in a cluster with the set probing transmission power,
    (iii) when a probing response message is received from the other mobile station, generate a probing response list for the other mobile station having transmitted the probing response message,
    (iv) determine whether a cluster list for mobile stations existing in the cluster corresponds to the probing response list, and
    (v) determine a gateway mobile station according to a result of the determination as to whether the cluster list for mobile stations existing in the cluster corresponds to the probing response list,
  wherein, when the cluster list corresponds to the probing response list, the control unit is further configured to generate a gateway determination message.

2. The apparatus of claim 1, wherein, when the cluster list corresponds to the probing response list, the control unit is configured to determine the apparatus for determining the gateway as the gateway mobile station.

3. The apparatus of claim 1,
  wherein, when the cluster list does not correspond to the probing response list, the control unit is configured to determine whether the probing transmission power is less than a maximum transmission power, and
  wherein, when the probing transmission power is less than the maximum transmission power, the control unit is configured to:
    increase the probing transmission power by a preset power amount, and
    thereafter transmit the probing request message to the other mobile station within the cluster with the increased probing transmission power.

4. The apparatus of claim 3,
  wherein, when the probing transmission power is greater than the maximum transmission power, the control unit is configured to determine whether a gateway notice message is received from the other mobile station within the cluster, and
  wherein, when the gateway notice message is received from a first mobile station, the control unit is configured to:
    generate a gateway identification message, and
    broadcast the gateway identification message to other mobile stations within the cluster.

5. The apparatus of claim 4,
  wherein, when the gateway notice message is not received from the first mobile station for a predetermined time and a broadcasted non-receipt notice message is received, the control unit is configured to compare a probing response list of the first mobile station with a probing response list of the apparatus for determining the gateway, and
  wherein, a number of mobile stations in the probing response list of the first mobile station is greater than a number of mobile stations in the probing response list of the apparatus for determining the gateway, the control unit is configured to determine the first mobile station as the gateway mobile station.

6. The apparatus of claim 5,
  wherein, when the number of mobile stations in the probing response list of the first mobile station is less than the number of mobile stations in the probing response list of the apparatus for determining the gateway, the control unit is configured to:
    calculate a number of mobile stations included in both the probing response list of the first mobile station and the probing response list of the apparatus for determining the gateway, and
    compare the calculated number of mobile stations with a preset threshold value, and
  wherein, when the calculated number of mobile stations is less than the threshold value, the control unit is configured to determine the first mobile station and the apparatus for determining the gateway as the gateway mobile station.

7. The apparatus of claim 6,
  wherein, when the calculated number of mobile stations is greater than the preset threshold value, the control unit is configured to transmit a gateway re-setup request message for resetting the gateway to the first mobile station, and
  wherein, when a response message is received from the first mobile station in response to the gateway re-setup request message, the control unit is configured to receive the gateway notice message.

8. The apparatus of claim 1, wherein the apparatus is a mobile station.

9. A method of an apparatus for determining a gateway considering low power, the method comprising:
  setting a probing transmission power for determining the gateway;
  transmitting a probing request message to another mobile station existing in a cluster with the set probing transmission power;
  when a probing response message is received from the other mobile station, generating a probing response list for the other mobile station having transmitted the probing response message;
  determining whether a cluster list for mobile stations existing in the cluster corresponds to the probing response list; and
  determining a gateway mobile station according to a result of the determination as to whether the cluster list for mobile stations existing in the cluster corresponds to the probing response list,
  wherein the determining of the gateway mobile station comprises, when the cluster list corresponds to the probing response list, generating a gateway determining massage.

10. The method of claim 9, wherein the determining of the gateway mobile station according to the result of the determination as to whether the cluster list for mobile stations existing in the cluster corresponds to the probing response list comprises:

when the cluster list corresponds to the probing response list, determining the apparatus for determining the gateway as the gateway mobile station.

11. The method of claim 9, wherein the determining of the gateway mobile station according to the result of the determination as to whether the cluster list for mobile stations existing in the cluster corresponds to the probing response list comprises:

when the cluster list does not correspond to the probing response list, determining whether the probing transmission power is less than a maximum transmission power; and when the probing transmission power is less than the maximum transmission power, increasing the probing transmission power by a preset power amount and thereafter transmitting the probing request message to the other mobile station within the cluster with the increased probing transmission power.

12. The method of claim 11, further comprising:

when the probing transmission power is greater than the maximum transmission power, determining whether a gateway notice message is received from the other mobile station within the cluster; and when the gateway notice message is received from a first mobile station, generating a gateway identification message and broadcasting the gateway identification message to other mobile stations within the cluster.

13. The method of claim 12, further comprising:

when the gateway notice message is not received from the first mobile station for a predetermined time and a broadcasted non-receipt notice message is received, comparing a probing response list of the first mobile station and a probing response list of the apparatus for determining the gateway; and when a number of mobile stations in the probing response list of the first mobile station is greater than a number of mobile stations in the probing response of the apparatus for determining the gateway, determining the first mobile station as the gateway mobile station.

14. The method of claim 13, further comprising:

when the number of mobile stations in the probing response list of the first mobile station is less than the number of mobile stations in the probing response of the apparatus for determining the gateway, calculating a number of mobile stations included in both the probing response list of the first mobile station and the probing response of the apparatus for determining the gateway;

comparing the calculated number of mobile stations with a preset threshold value; and when the calculated number of mobile stations is less than the threshold value, determining the first mobile station and the apparatus for determining the gateway as the gateway mobile station.

15. The method of claim 14, further comprising:

when the calculated number of mobile stations is greater than the preset threshold value, transmitting a gateway re-setup request message for resetting the gateway to the first mobile station; and when a response message is received from the first mobile station in response to the gateway re-setup request message, waiting to receive the gateway notice message.

16. A non-transitory computer readable recording medium having recorded thereon a computer program for executing, in at least one computer, the method of claim 9.

17. The apparatus of claim 1, wherein, when the cluster list corresponds to the probing response list, the control unit is further configured to broadcast the gateway determination message to all mobile stations within the cluster.

18. The method of claim 9, wherein the determining of the gateway mobile station according to the result of the determination as to whether the cluster list for mobile stations existing in the cluster corresponds to the probing list comprises broadcasting the gateway determination message to all mobile stations within the cluster.

* * * * *